United States Patent
Welborn et al.

(10) Patent No.: US 6,954,858 B1
(45) Date of Patent: Oct. 11, 2005

(54) COMPUTER VIRUS AVOIDANCE SYSTEM AND MECHANISM

(76) Inventors: Kimberly Joyce Welborn, 331 Sandpiper Dr., Davis, CA (US) 95616; Christopher Michael Welborn, 331 Sandpiper Dr., Davis, CA (US) 95616

( * ) Notice: Subject to any disclaimer, the term of this patent is extended or adjusted under 35 U.S.C. 154(b) by 0 days.

(21) Appl. No.: 09/470,058

(22) Filed: Dec. 22, 1999

(51) Int. Cl.$^7$ .......................... H04L 9/00; G06F 11/30; G06F 15/16
(52) U.S. Cl. .................. 713/200; 713/188; 709/205; 709/206; 434/118
(58) Field of Search .................... 713/170, 200, 713/201, 188; 709/205, 206; 434/118; 380/25

(56) References Cited

U.S. PATENT DOCUMENTS

| | | | |
|---|---|---|---|
| 4,975,950 A | 12/1990 | Lentz | 713/200 |
| 5,121,345 A | 6/1992 | Lentz | 713/188 |
| 5,319,776 A | 6/1994 | Hile et al. | 713/200 |
| 5,349,655 A | 9/1994 | Mann | 714/6 |
| 5,390,247 A * | 2/1995 | Fischer | 713/176 |
| 5,408,642 A | 4/1995 | Mann | 714/38 |
| 5,421,006 A | 5/1995 | Jablon et al. | 714/36 |
| 5,440,723 A | 8/1995 | Arnold et al. | 714/2 |
| 5,442,699 A | 8/1995 | Arnold et al. | 713/188 |
| 5,452,442 A | 9/1995 | Kephart | 714/38 |
| 5,475,839 A | 12/1995 | Watson et al. | 713/2 |
| 5,485,575 A | 1/1996 | Chess et al. | 714/38 |
| 5,509,120 A | 4/1996 | Merkin et al. | 713/200 |
| 5,511,163 A | 4/1996 | Lerche et al. | 714/28 |
| 5,511,184 A | 4/1996 | Lin | 710/261 |
| 5,537,540 A | 7/1996 | Miller et al. | 714/38 |
| 5,598,531 A | 1/1997 | Hill | 713/200 |
| 5,613,002 A | 3/1997 | Kephart et al. | 713/200 |
| 5,684,875 A | 11/1997 | Ellenberger | 482/4 |
| 5,696,822 A | 12/1997 | Nachenberg | 713/200 |
| 5,765,030 A | 6/1998 | Nachenberg et al. | 714/33 |
| 5,809,138 A | 9/1998 | Netiv | 713/200 |
| 5,826,013 A | 10/1998 | Nachenberg | 713/200 |
| 5,832,208 A * | 11/1998 | Chen et al. | 713/201 |
| 5,842,002 A | 11/1998 | Schnurer et al. | 703/21 |
| 5,854,916 A | 12/1998 | Nachenberg | 703/21 |
| 5,881,151 A | 3/1999 | Yamamoto | 713/200 |
| 5,892,904 A | 4/1999 | Atkinson et al. | 713/201 |
| 5,907,834 A | 5/1999 | Kephart et al. | 706/20 |
| 5,918,008 A | 6/1999 | Togawa et al. | 713/200 |
| 5,944,821 A | 8/1999 | Angelo | 713/200 |
| 5,956,481 A | 9/1999 | Walsh et al. | 713/200 |
| 5,964,889 A | 10/1999 | Nachenberg | 714/25 |
| 5,987,610 A | 11/1999 | Franczek et al. | 713/200 |
| 5,999,723 A | 12/1999 | Nachenberg | 703/22 |
| 6,014,688 A * | 1/2000 | Venkatraman et al. | 709/206 |
| 6,016,546 A | 1/2000 | Kephart et al. | 713/200 |
| 6,021,510 A | 2/2000 | Nachenberg | 714/38 |
| 6,026,502 A | 2/2000 | Wakayama | 714/38 |
| 6,067,410 A | 5/2000 | Nachenberg | 395/500.49 |
| 6,073,239 A | 6/2000 | Dotan | 713/200 |
| 6,088,803 A | 7/2000 | Tso et al. | 713/201 |
| 6,092,194 A | 7/2000 | Touboul | 713/200 |
| 6,182,117 B1 * | 1/2001 | Christie et al. | 709/205 |
| 6,219,669 B1 * | 4/2001 | Haff et al. | 707/10 |
| 6,219,694 B1 * | 4/2001 | Lazaridis et al. | 709/206 |
| 6,256,664 B1 * | 7/2001 | Donoho et al. | 709/204 |
| 2002/0178137 A1 * | 11/2002 | Hasegawa | 707/1 |

* cited by examiner

*Primary Examiner*—Gilberto Barrón
*Assistant Examiner*—A. Nobahar

(57) ABSTRACT

Nearly all computer viruses require an action by a computer user to infect and spread. The key is to educate users not to open e-mail attachments that might carry computer viruses. The key is behavior modification, as education is not sufficient. Effective behavior modification must have a means to reinforce the change and to measure how widespread the change is in a population. The invention is used to reinforce and measure the change in user behavior. The invention sends an e-mail with an attachment to e-mail users and creates a list of all users that open the attachment. The user is sent an e-mail with an attachment that looks similar to attachment that contain computer viruses. If the attachment is opened, an e-mail is sent to a specific e-mail address. This e-mail address collects all of the e-mail from users who have not changed behavior and need additional education or management attention.

12 Claims, 2 Drawing Sheets

Holiday e-mails can carry a danger

Experts are warning about viruses in infected attachments

BY DAVID L. WILSON
Mercury News Washington Bureau

WASHINGTON — The holiday season is often a time when computer users pass around amusing electronic animations via e-mail. Although most of these attachments are harmless, some may hide destructive computer viruses.

Indeed, anti-virus watchdogs identified a new virus this week that masquerades as an innocuous bunch of digital photos but actually plants a time bomb that will erase the computer's hard drive on Jan. 1, 2000.

Because that's the same date that the Y2K bug is expected to cause many computer systems to crash, the virus might fool users into believing they have a Y2K problem.

Virus fighters expect more viruses linked to Y2K to emerge as Jan. 1 approaches, and they are once again begging computer users to avoid opening e-mailed attachments.

"We're telling people to be very wary of electronic Christmas cards," said Sal Viveros, a virus expert with Network Associates Inc., based in Santa Clara.

The Mypics worm, as this latest threat is called, arrives attached to what appears to be e-mail from a friend or associate that says, "Here's some pictures for you!"

Opening the attached file, Pics4You.exe, will infect your computer with the virus, which will af- See VIRUSES, Page 3C

Y2K PROBLEM

Virus fighters expect more viruses linked to Y2K to emerge as Jan. 1 approaches.

DRAWING 1, PAGE 1

Holiday e-mails carry risk

■ VIRUSES

*from Page 1C* tempt to mail itself to 50 people it finds in your Microsoft Outlook e-mail address book. It will also change the home page of your Microsoft Internet Explorer Web browser to a pornographic site.

The real damage occurs Jan. 1, when the virus will change the computer's most basic software and attempt to erase the hard drive.

The increasing frequency of alerts relating to things like electronic viruses is prompting renewed calls for safe computing, but few experts expect users to change their habits.

"It would be great if everybody followed the rule: Never open e-mail attachments if you can help it," said Carey Nachenberg, chief researcher at Symantec's anti-viral research center. "But I don't think they will."

In general, just looking at an infected e-mail can't hurt; users have to do something else to activate the virus and infect their system. Typically, a virus comes as an attachment to e-mail, such as a document that can be read only with a word-processor like Microsoft Word.

Clicking on the attachment to read the document can infect the user's machine with any virus that was lurking on the sender's machine. A virus is dangerous because it can alter or destroy data.

Until recently, experts advised users to simply avoid opening attachments sent by people they didn't know. Unfortunately, the most troublesome viruses today spread by fooling people into believing the document was sent by a friend.

For instance, Mypics attempts to mail copies of itself to anyone in the user's e-mail address book. Anyone receiving such a missive from, say, their brother, might open that attachment without thinking about it.

Most software vendors are aware of the problem and take steps to get around it. For instance, Blue Mountain Arts, a purveyor of electronic greeting cards, doesn't send the card via e-mail, just a Web address, which can be accessed though any browser.

Jared P. Schutz, the company's executive director, said that's the only way to be safe. "I would highly recommend that people avoid opening attached files, even from people that they know," he said.

A computer virus for Christmas

Many computer viruses travel as innocent-looking files attached to electronic mail. With the holiday season upon us, people often e-mail electronic greetings and photographs to friends and family members, but not every file that comes with an e-mail is safe. This year poses special hazards, according to anti-virus experts, because many virus writers may use the Y2K bug to hide their mischief. This week, anti-virus companies detected a new virus, named Mypics, that could erase a computer's hard drive on Jan. 1.

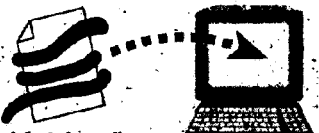

Infected e-mail attachment

1 WORM ARRIVES
You get an e-mail with an attachment named Pics4You.exe saying, "Here's some pictures for you!"

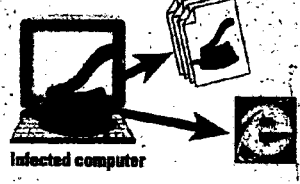

Infected computer

2 WORM REPRODUCES
If you open the attachment, the worm will send itself to 50 people in your Microsoft Outlook address book. It also changes the home page of your Microsoft Internet Explorer browser to a pornographic site.

3 WORM WAITS
On Jan. 1, 2000, the worm will overwrite key system data. The user will see an apparent Y2K-related error when starting up the computer. The worm will then destroy all data on the hard drive.

HOW TO PROTECT YOURSELF
Avoid opening attachments to e-mail if possible. If you want the attachment, call the sender and verify its contents before opening it. Update virus protection software weekly and use it to scan attachments. Back up critical data regularly.

Source: Symantec Corp.
MERCURY NEWS

That's the standard advice, but nobody expects attachments to disappear tomorrow, despite the warnings.

"I can't tell you whether we've still got a lot of people who just haven't gotten the message — newbies — or whether it's people who should know better but do it anyway," said Sandra Sparks, director of the Energy Department's Computer Incident Advisory Capability, which works to ensure the security of government computer systems. "Maybe it's the same kind of thing that happens with people who don't wear a seat belt."

Although many corporations scan all incoming e-mail and destroy any known virus before it's delivered into an employee's mailbox, very few Internet service providers offer such a feature, largely because examining every single data packet that flows into the pipes can slow service.

So for now, anti-virus protection is largely the responsibility of individuals.

To protect against all viruses, experts say virus protection software should be updated weekly.

Attachments generally should be avoided. If you receive an attachment that you want, contact the sender and ask if it was deliberately sent. If possible, ask that the information in the attachment be copied and pasted into a plain e-mail file and resent, or posted on a Web page.

If that's not possible and you must open the attachment, make sure it's scanned first with an updated anti-viral program.

Even with such precautions, it's still possible for a new, fast-moving virus to get through your defenses. The only real protection users have is to regularly make copies of the data on their hard drive.

"Back up your critical stuff at least once a week," said Sparks. "I know that's annoying, and I know it takes time. But compare that amount of time vs. the amount of time you'd spend trying to rebuild your system, or your company, and that's a very small investment."

Contact David Wilson at (202) 383-6020 or at dwilson@sjmercury.com.

COMPUTER VIRUS AVOIDANCE SYSTEM AND MECHANISM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to a computer system that aids in the behavior modification of computer users who unknowingly and innocently spread computer viruses, specifically by teaching computer users to avoid computer viruses with the use of mock computer viruses and feedback measurements.

The Battle Against Computer Viruses:

Computer viruses pose significant threats to computer systems. Viruses cause loss of data, destroy computer hardware, create negative impacts to computer networks and systems, and disrupt business, government, and personal affairs. In the battle against computer viruses, an entire industry was created to develop and sell "anti-virus" software to detect, remove, and insulate computers from viruses. Numerous patents have been granted to achieve these same goals. Examples of corporations within the anti-virus industry are Symantec and Network Associates. Currently, the control of viruses is dependent upon companies such as these to identify characteristics of viruses, write anti-virus software to detect viruses when encountered, and insulate computers from viruses. However, viruses are created faster than anti-virus software, and anti-virus software cannot always prevent outbreaks of virus infections. It is desirable to avoid the negative impacts of virus infections without reliance on software that needs to continually adapt to detect new specific viruses.

What Are Computer Viruses?

A computer virus is a program that invades computer host systems. Once inside a host system, the virus may replicate and create copies of itself. The virus may also cause damage to the host system. Viral programs can damage host systems by using the host file system to overwrite data in host systems, or over-write data stored in networks attached to host systems, or create numerous other disruptions or damage. In addition to damaging the host system, the virus may perpetuate itself by transmitting replicated copies to other computer systems. Most computer viruses use e-mail systems to transmit the replicated copies to other computer systems. By transmitting replicated copies of itself to other computer systems, the virus invades new host systems and continues the life-cycle of viral replication, host system damage, and transmission of duplicate virus programs.

How Computer Users Spread Viruses:

E-mail systems alone cannot activate viral programs within host systems. Viral programs require activation by computer users, and therefore viral programs are sent as file attachments to e-mail messages. The creators of the viral programs rely on computer users to open the infected file attachments. The viral programs activate when users open infected attached files. The term "open" means the user starts the program in the attachment or starts a program associated with the attachment. In Microsoft Windows and NT operating systems, data files are named in a two part format of the form xxxxxxxx.yyy, where the "." separates the user given name, "xxxxxxxx", from the extension, "yyy". The operating system uses the extension, "yyy", to select how the data file is to be treated when opened. For example if the extension is "exe", then the operating system treats the data file as an executable program and passes control to it when opened. Or, if the extension is "doc", the operating system associates the document with the Microsoft Word program, loads the Microsoft Word program, and passes control to the Microsoft Word program with the data file as an input file.

What Are Viral Infected E-Mail Attachments?

Viral infected e-mail attachments are of two types: 1) programs that execute when opened or 2) "macros" that execute when data files are opened as documents in other programs such as Microsoft Word. A macro is a program that is written in a language specific to another program such as Microsoft Word. Macros are used to automate sets of "user actions". Examples of macro "user actions" are the ability to open and write data files, and to send e-mail messages with attachments to recipients in the users' e-mail directories. Viral macros may use the previously described user actions and other functions to send replicated copies of itself as attachments to other e-mail users. The infected attachments may cause damage to data in the host system or to data in a network that is attached to the host system.

Life-Cycle of Computer Viruses:

The key to life or the goal of viruses is to replicate and transmit copies of itself to other computer systems. There are viral programs that can access the computer users' e-mail directory and the computer users' e-mail folders. This access allows the virus to send additional replicated viral attachments to associates of the user. The viral e-mail messages appear to originate from someone the recipient knows and trusts, when in fact the virus sends the e-mail message itself. The unsuspecting recipient opens the infected files due to the mistaken belief that the file is virus-free merely because the e-mail was sent from a familiar e-mail address. The opened and activated virus file repeats its cycle, and the virus succeeds in its continuous spread to other computer systems.

What Is Being Done?

Anti-virus companies such as Symantec and Network Associates attempt to stop viruses with the detection, removal, and insulation of computer viruses. Additionally, software creators of e-mail systems attempt to curb the spread of viruses by building features into e-mail programs that attempt to prevent the opening of viral attachments. For example, Microsoft Corporation added capabilities to recent releases of Outlook and Exchange e-mail programs that makes opening attachments with executable programs a two-step process. In the Microsoft Outlook e-mail program, an attachment to an e-mail appears as an icon in the body of the e-mail. The file name appears as text in the icon. The user "opens" the attachment by double clicking on the icon. The first step consists of a warning message that is displayed when the icon is double-clicked. The user must perform a second action to actually open the file. Consistent with this, recent releases of Microsoft Word and Excel have a similar two-step document opening process if there is a macro in the document. First the user is warned that there is a macro in the document. The second step requires the user to choose to not open the document, disable the macro and open the document, or open the document with an active macro. In spite of these virus avoidance measures, computer users continue to open attachments with viruses, which in turn harms their systems, and sends replicated viral copies to other unsuspecting computer systems. An article written by David L. Wilson and published in the Dec. 4, 1999 edition of the *San Jose Mercury News* is included as background information on how computer viruses damage, replicate and spread.

SUMMARY OF THE INVENTION

Nearly all computer viruses require an action by a computer user to infect and spread. The key is to educate users not to open e-mail attachments that might carry computer viruses. The key is behavior modification, as education is not sufficient. Effective behavior modification must have a means to reinforce the change and measure the change in user behavior. The invention sends an e-mail with an attachment to e-mail users and creates a list of all users that open the attachment. The user is sent an e-mail with an attachment that looks similar to attachments that contain computer viruses. If the attachment is opened, an e-mail is sent to a specific e-mail address. This e-mail address collects all of the e-mail from users who have not changed behavior and need additional education or management attention.

BRIEF DESCRIPTION OF THE SEVERAL VIEWS OF THE DRAWING

An article written by David L. Wilson and published in the Dec. 4, 1999 edition of the *San Jose Mercury News* is included as background information on how computer viruses damage, replicate and spread. The article demonstrates that attempts are made by the mass media to educate computer users to avoid computer viruses. Despite the widespread information available to users on how to avoid computer viruses, the advice is left unheeded and the viruses continue to damage, replicate, and spread. "The two page article is labeled Drawing 1, Page 1 and Drawing 1 (Continued), Page 2."

DETAILED DESCRIPTION OF THE INVENTION

Computer Users Spread Computer Viruses:

Nearly all computer viruses require action by computer users for the viruses to infect and spread. The key to controlling viruses is to educate users not to open file attachments that might carry viruses. Education about how to avoid computer viruses is similar to education about how to avoid incurable human viral diseases. For example, in some cases of human disease, there are human behaviors that can eliminate or minimize exposure to infectious disease. Computer viruses are similar in that behavior modification on the part of computer users can greatly eliminate or minimize exposure to computer viruses. However, education alone is an ineffective tool to stopping viruses. There are many widely published writings and documents, such as the *San Jose Mercury News* article, that warn of the danger of opening computer viral attachments yet many people continue to open infectious attachments. Effective behavior modification must have a means to reinforce the change, and to measure how widespread the change is in a population.

Changing Human Behavior is the Key to Conquering Computer Viruses:

In general, most computer users do not need to send executable programs as attachments or documents with macros to other e-mail users. One behavior change is that a user should not send executable programs or documents with macros unless absolutely necessary. If it is necessary to send such attachments, the sender needs to communicate to the recipient to expect specific attachments. The second, and most important, behavior change is that a user should not open an attachment that is an executable program or a document with a macro unless there is specific knowledge that the attachment is safe to open. The third behavior change is that a user should inform their information services staff if they receive an e-mail attachment that appears to contain a computer virus. This last behavior provides early warning of new computer viruses, and allows companies such as Symantec and Network Associates to update their anti-virus software detection programs before the virus becomes widespread.

How Behavior Changes can be Made, Measured and Tracked:

Our invention tests, reinforces, and measures the changes in computer user behavior in regards to viral attachments, or attachments that may carry viruses. The invention sends e-mail messages with attachments to e-mail users. The attachments look similar to attachments that carry computer viruses. The invention creates a list of all users that open the attachment. If the attachment is opened, an e-mail is sent to a specific e-mail address—perhaps that of an Information Systems manager who will monitor behavioral changes. This specific e-mail address collects all of the e-mail addresses and information from users who have not changed their behavior and need additional education or management attention. Additionally, a message within the attachment is displayed to the e-mail user informing them they opened a file that may have contained an infected virus. The e-mail user may also receive a separate e-mail message informing them again that they opened a file that may have contained an infected virus.

It is possible to test, measure, and track behavioral changes of an entire e-mail user population of a corporation for example, or randomly sample a small portion of an e-mail community. E-mail systems such as Microsoft Outlook have the ability to track when a user receives an e-mail message, opens an e-mail message, and/or deletes an e-mail message. However these e-mail tracking functions only apply to the e-mail messages and not to the attachments. The behaviors of e-mail users, such as deletion of the invention e-mail, can be tracked and measured. In addition, for behavior reinforcement, the attachment can display a message that warns the user that they have opened an attachment that could have been a computer virus. The attachment can also act very similar to a computer virus and replicate itself and transmit copies to other e-mail addresses (secondary e-mail addresses). Secondary e-mail addresses can be gathered from the original user's personal e-mail directories. It will appear to the secondary e-mail recipients that the e-mail attachments originated from people that the secondary recipients might know, when in fact the e-mail messages and attachments originated from the invented viruses. These actions are similar to the behavior of real computer viruses and they will test an organization for safe computer behavior. To limit the impact of the computer virus replication process, the invented virus may contain a counter that changes with each replication cycle. The replication process can cease after a specified number of cycles.

The Concept and Design of the Invented Virus:

The invention is basically a benign computer virus, and therefore must be designed to pass undetected by anti-virus software and be attractive for e-mail users to open. Since anti-virus software is continuously updated and user behavior will become more sophisticated, the invention must also be continuously updated to mimic harmful "wild" computer viruses.

The basic elements of the invented benign virus can be implemented as executable programs written in C++, Visual Basic, or a number of programming languages that contain programming functions that use Mail Application Programming Interface, MAPI. The invention uses MAPI to send feedback e-mail information to a specific e-mail address of a person who will monitor, measure, and track computer user behavior (i.e. the person who will perform the "tracking function"—for example an Information Systems administrator). The invented program is sent as an attachment to the e-mail users. The invention can also be implemented as a Microsoft Word macro in a Word document using macros such as "File", "Send to", or "Mail Recipient" functions. The macros can send e-mail feedback to the person performing the "tracking function".

The design of the benign virus can be crafted from virulent viruses to mimic their appearance and replication capabilities. The virulent virus would be modified to send the e-mail information to the person performing the tracking function, and the destructive functions would be deleted. The virulent virus may also need to be modified to circumvent anti-virus programs. The resulting benign virus is sent as an e-mail attachment to the test population. The person performing the tracking function will receive e-mails in his/her e-mail "in-box" from all of the users who open the attachment. The tracking function person's e-mail "in-box" can be used to generate a list of users who need additional attention and behavior modification. The steps of creating the e-mail user list to be tested, sending the e-mails, and creating the list of e-mail users may be done as manual steps or automated as a program using the MAPI functions.

One key element in the battle against computer viruses is changing user behavior to prevent opening infected e-mail attachments. This invention aids in reinforcing and measuring changes in user behavior.

We claim:

1. A computer user behavior modification method for avoiding computer viruses in an electronic messaging system with users wherein a list of users who activate a mock computer virus is created, comprising:

sending a user a message with a mock computer virus;

adding the user's identifier to the list of users who activate a mock computer virus when the user activates the mock computer virus; and using the list of users who activate a mock computer virus to identify computer users whose behavior needs to be modified to avoid activating real computer viruses.

2. The computer user behavior modification method for avoiding computer viruses of claim 1, wherein the mock computer virus displays a message to the user when the mock computer virus is activated.

3. The computer user behavior-modification method for avoiding computer viruses of claim 1, wherein the list of users who activate a mock computer virus is used to measure the behavior of computer users to avoid computer viruses.

4. The computer user behavior modification method for avoiding computer viruses of claim 1, wherein a user who did not activate the mock computer virus and is not on the list of users who activate a mock computer virus is rewarded.

5. A method for creating a list of electronic message system users whose behavior may activate a computer virus in an electronic message system with users, comprising:

sending a mock computer virus in an electronic message to a user;

adding the user to the list of electronic message system users whose behavior may activate a computer virus when the user activates the mock virus; and using the list of electronic message users whose behavior may activate a computer virus to identify users whose behavior may activate a real computer virus.

6. The method for creating a list of electronic message system users whose behavior may activate a computer virus of claim 5, wherein the mock computer virus displays a message when a user activates the mock computer virus.

7. The method for creating a list of electronic message system users whose behavior may activate a computer virus of claim 5, wherein the list of electronic message system users whose behavior may activate a computer virus is used to measure the behavior of users who may activate a real computer virus.

8. The method for creating a list of electronic message system users whose behavior may activate a computer virus of claim 5, wherein a user who does not activate the mock computer virus and is not on the list of electronic message system users whose behavior may activate a computer virus is rewarded.

9. A method for creating a list of electronic message system users who activate a mock computer virus in an electronic message system with users, comprising:

sending an electronic message with a mock computer virus to a user;

adding the user to the list of electronic message system users who activate a mock computer virus when the user activates the mock computer virus; and using the list of electronic message system users who activate a mock computer virus to identify users whose behavior may activate a real computer virus.

10. The method for creating a list of electronic message system users who activate a mock computer virus of claim 9, wherein the mock computer virus displays a message when the user activates the mock computer virus.

11. The method for creating a list of electronic message system users who activate a mock computer virus of claim 9, wherein the list of electronic message system users who activate a mock computer virus is used to measure the behavior of users to activate computer viruses.

12. The method for creating a list of electronic message system users who activate a mock computer virus of claim 9, wherein a user who does not activate the mock computer virus and is not on the list of electronic message system users who activate a mock computer virus is rewarded.

* * * * *